(12) United States Patent
Howells

(10) Patent No.: US 8,702,380 B2
(45) Date of Patent: Apr. 22, 2014

(54) CLAMPING ASSEMBLY

(75) Inventor: Philip T. Howells, Bristol (GB)

(73) Assignee: Rolls-Royce PLC, London (GB)

( * ) Notice: Subject to any disclaimer, the term of this patent is extended or adjusted under 35 U.S.C. 154(b) by 824 days.

(21) Appl. No.: 12/897,167

(22) Filed: Oct. 4, 2010

(65) Prior Publication Data

US 2011/0129339 A1    Jun. 2, 2011

(30) Foreign Application Priority Data

Dec. 1, 2009  (GB) .................................. 0920973.5

(51) Int. Cl.
*F03D 11/00* (2006.01)

(52) U.S. Cl.
USPC .......................................... 415/142; 415/229

(58) Field of Classification Search
USPC .................. 415/9, 142, 229, 230, 231; 416/2; 464/74, 73, 161
See application file for complete search history.

(56) References Cited

U.S. PATENT DOCUMENTS

2008/0185906 A1    8/2008  Langer et al.

FOREIGN PATENT DOCUMENTS

GB         2 131 916 A    6/1984
WO         WO 99/43927    9/1999

OTHER PUBLICATIONS

Search Report issued in corresponding British Application No. GB 0920973.5, dated Mar. 9, 2010.

*Primary Examiner* — Dwayne J White
(74) *Attorney, Agent, or Firm* — Oliff PLC

(57) ABSTRACT

A clamping assembly comprising a bearing support member (16), the bearing support member being clampable to a shaft (2) by virtue of a clamping member (24) adaptable to tighten the bearing support member to the shaft, wherein at least a portion (16') of the bearing support member (16) is disposable between a first abutment surface (28) provided on the clamping member and a second abutment surface (25) provided on the shaft; and wherein the portion (16') of the bearing support member (16) comprises one or more protrusions (30) and one or more depressions (32) provided on an end face (16*a*, 16*b*) of the portion of the bearing support member, the protrusions and depressions being arranged to interface with one or more corresponding depressions (36) and protrusions (34) provided on one of the first abutment surface of the clamping member and the second abutment surface of the shaft, the respective protrusions and depressions being disposed so as to resist relative rotation between the shaft and the bearing support member.

11 Claims, 3 Drawing Sheets

CLAMPING ASSEMBLY

This invention relates to a clamping assembly and particularly but not exclusively relates to a clamping assembly for a gas turbine engine.

BACKGROUND

Gas turbine engines comprise one or more rotating shafts. As shown in FIG. 1, such a rotating shaft 2 with a centre-line 4 may be held in a bearing 6. The bearing 6 permits the shaft 2 to rotate with respect to a static housing 8 or another shaft. The bearing 6 comprises an inner rotating race 10 and an outer static race 12 with a ball bearing 14 or rollers therebetween.

Typically, there is a support shaft 16 between the bearing 6 and the rotating shaft 2. The inner rotating race 10 of the bearing 6 is secured against an abutment shoulder 20 on the support shaft 16 by virtue of a threaded nut 18. The threaded nut 18 engages a corresponding thread on the support shaft 16. The support shaft 16 is in turn secured to the shaft 2 by virtue of a rotating drive arm 24 and a further threaded nut 22, which engages a corresponding thread on the shaft 2. The further threaded nut 22 holds the rotating drive arm 24 against a portion 16' of the support shaft 16, which is in turn held against an abutment shoulder 25 on the shaft 2.

In the event that the bearing 6 seizes, there is a risk that the support shaft 16 will stay stationary relative to the housing 8 with the shaft 2 continuing to rotate. Such an occurrence would cause a catastrophic failure to the shaft 2 due to the loads placed upon it. Therefore, in order to reduce the likelihood of this occurring, it has been previously-proposed to place a set of axially disposed splines 26 between the support shaft 16 and the drive arm 24.

However, whilst such splines 26 may perform their intended function, they add a significant amount of weight to the bearing assembly. Furthermore, a bearing assembly with such splines requires a larger forging, casting or starting stock of material and the manufacturer requires the ability to machine internal and external splines. The final components will also have increased weight, due to the inclusion of the splines. The present invention therefore seeks to address these issues.

STATEMENTS OF INVENTION

According to a first aspect of the present invention there is provided a clamping assembly comprising a bearing support member, the bearing support member being clampable to a shaft by virtue of a clamping member adaptable to tighten the bearing support member to the shaft, wherein at least a portion of the bearing support member is disposable between a first abutment surface provided on the clamping member and a second abutment surface provided on the shaft; and wherein the portion of the bearing support member comprises one or more protrusions and one or more depressions provided on an end face of the portion of the bearing support member, the protrusions and depressions being arranged to interface with one or more corresponding depressions and protrusions provided on one of the first abutment surface of the clamping member and the second abutment surface of the shaft, the respective protrusions and depressions being disposed so as to resist relative rotation in a second direction between the shaft and the bearing support member.

According to a second aspect of the present invention there is provided a bearing assembly comprising a bearing support member and a clamping member adaptable to clamp the bearing support member to a shaft, wherein at least a portion of the bearing support member is disposed between a first abutment surface provided on the clamping member and a second abutment surface provided on the shaft; and wherein the portion of the bearing support member comprises one or more protrusions and one or more depressions provided on an end face of the portion of the bearing support member, the protrusions and depressions being arranged to interface with one or more corresponding depressions and protrusions provided on one of the first abutment surface of the clamping member and the second abutment surface of the shaft, the respective protrusions and depressions being disposed so as to resist relative rotation between the shaft and the bearing support member.

The protrusions provided on the portion of the bearing support member may comprise an angled surface angled with respect to a radial plane. The protrusions provided on one of the first abutment surface of the clamping member and the second abutment surface of the shaft may comprise a corresponding angled surface such that rotation of the bearing support member with respect to the shaft in a first direction may result in the bearing support member being axially displaced with respect to the shaft.

The respective protrusions and depressions may have a triangular or saw-tooth wave profile. The respective protrusions and depressions may have a square wave profile.

The clamping or bearing assembly may further comprise a securing means for clamping the clamping member and the bearing support member to the shaft. The securing means may comprise a threaded portion adapted to engage a corresponding threaded portion provided on the shaft.

The clamping member may comprise a threaded portion adapted to engage a corresponding threaded portion provided on the shaft.

The bearing support member may support a bearing. Alternatively, the bearing support member may comprise a bearing race of a bearing. The bearing may be disposed between a structure and the shaft. The shaft may be rotatable with respect to the structure.

A turbomachine may comprise the above-described clamping or bearing assembly. A gas turbine may comprise the above-described clamping or bearing assembly.

According to a third aspect of the present invention there is provided a clamping assembly comprising a bearing support member, the bearing support member being clampable to a shaft by virtue of a clamping member adaptable to tighten the bearing support member to the shaft, wherein at least a portion of the bearing support member is disposable between a first abutment surface provided on the clamping member and a second abutment surface provided on the shaft; and wherein there is further provided one or more cooperating formations on an end face of the portion of the bearing support member and on one of the first abutment surface of the clamping member and the second abutment surface of the shaft, the cooperating formations being disposed so as to resist relative rotation in a second direction between the shaft and the bearing support member.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
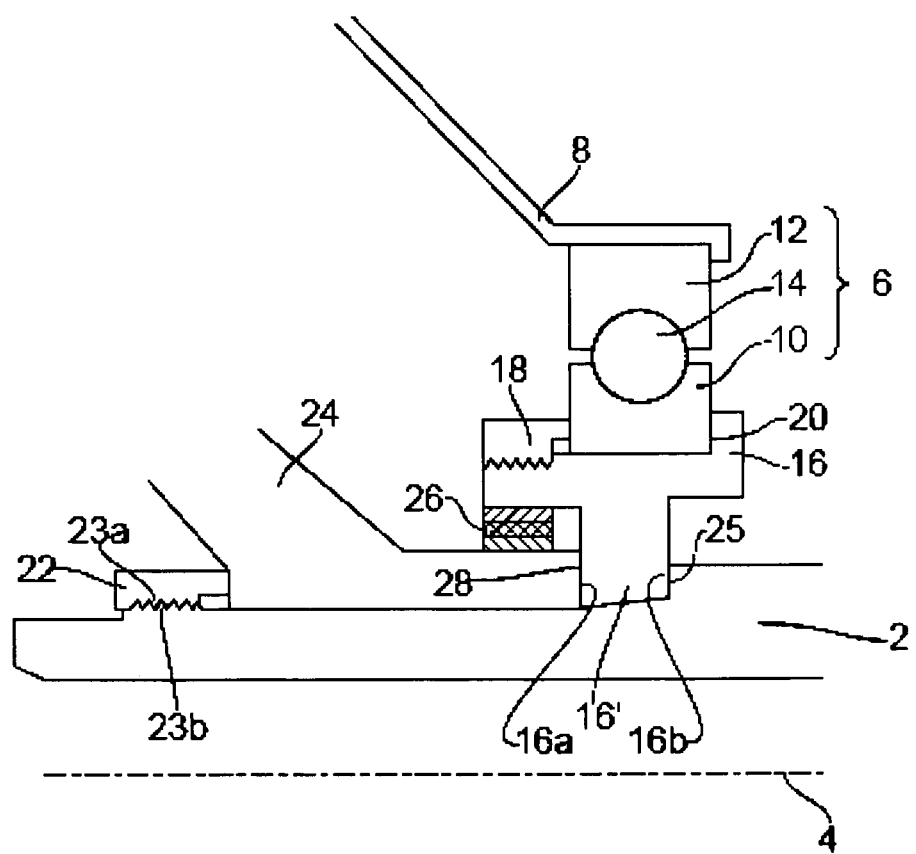
FIG. 1 is a sectional view of a prior art bearing assembly.
Figure 2A:
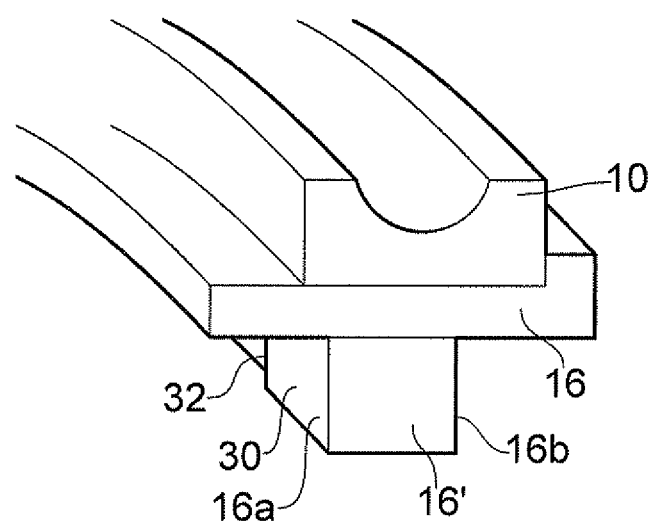
FIG. 2a is a section through a perspective view of a bearing support member according to an example of the present invention and FIG. 2b is a circumferential sectional view through a portion of the bearing support member.

With reference to FIGS. 2 and 3, a clamping assembly, according to an example of the present invention, comprises a bearing support member 16. As shown in FIG. 1, the bearing support member 16 is clampable to a shaft 2 by virtue of a clamping member 24, which is adapted to tighten the bearing support member 16 to the shaft 2. At least a portion 16' of the bearing support member 16 is disposed between a first abutment surface 28 provided on the clamping member 24 and a second abutment surface 25 provided on the shaft 2.

As shown in FIG. 1, the clamping or bearing assembly may further comprise a securing means 22, which may be in the form of a nut, for clamping the clamping member 24 and the bearing support member 16 to the shaft 2. The securing means 22 may comprise a threaded portion 23a adapted to engage a corresponding threaded portion 23b provided on the shaft 2. Although not shown, the clamping member 24 may comprise a threaded portion adapted to engage a corresponding threaded portion provided on the shaft 2. The clamping member threaded portion may be in addition to or instead of the securing means 22.

The bearing support member 16 may support a bearing 6. Alternatively, the bearing support member 16 may comprise a bearing race of a bearing, for example the inner bearing race 10 and the bearing support member 16 may be integral. The bearing 6 may be disposed between a structure 8 and the shaft 2. As a result, the shaft 2 may be rotatable with respect to the structure 8. Alternatively, the bearing 6 may be disposed between shaft 2 and a further shaft, the shafts being rotatable with respect to one another.

With reference to FIG. 2, the portion 16' of the bearing support member 16 comprises one or more protrusions 30 and one or more depressions 32 provided on an end face 16a, 16b of the portion 16' of the bearing support member 16. In the example shown, the protrusions and depressions 30, 32 are arranged on a first end face 16a to interface with one or more corresponding depressions and protrusions 36, 34 provided on the first abutment surface 28 of the clamping member 24. However, the protrusions and depressions may equally be arranged on a second end face 16b to interface with one or more corresponding depressions and protrusions provided on the second abutment surface 25 of the shaft 2. The projections and depressions may also be provided on both end faces 16a, 16b of the portion 16' of the bearing support member 16. The respective protrusions and depressions are disposed so as to resist relative rotation between the shaft 2 and the bearing support member 16.

In other words, the axially disposed splines of the previously-proposed bearing assembly have been removed and replaced by a set of protrusions and depressions on the faces that abut each other, between the bearing support member 16 and the clamping member 24.

The respective protrusions and depressions may be in the form of serrations. Accordingly, the protrusions and depressions may have a triangular or saw-tooth wave profile. Alternatively, the respective protrusions and depressions may have a square wave profile.

Figure 2B:
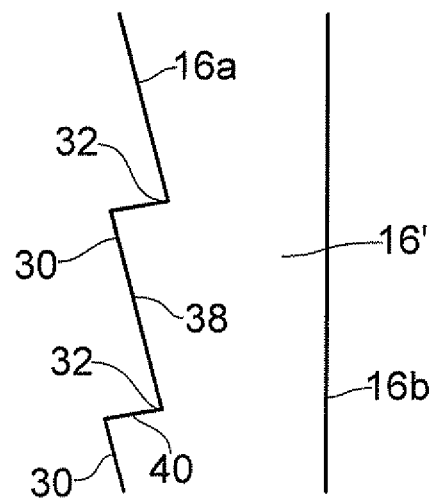

With reference to FIG. 2b and FIG. 3, the protrusions 30 provided on the portion 16' of the bearing support member 16 may comprise a first angled surface 38 angled with respect to a radial plane. The protrusions 30 provided on the portion 16' of the bearing support member 16 may comprise a second angled surface 40 angled with respect to a radial plane. The second angled surface 40 may be angled more steeply than the first angled surface 38 with respect to the radial plane. The corresponding protrusions provided on one of the first abutment surface 28 of the clamping member 24 and the second abutment surface 25 of the shaft may comprise corresponding angled surfaces. Rotation of the bearing support member 16 with respect to the clamping member 24 (and hence the shaft 2) in a first direction may result in the bearing support member 16 being axially displaced with respect to the shaft 2 as the first angled surface 38 rides up the corresponding angled surface on the clamping member 24. Rotation of the bearing support member 16 with respect to the clamping member 24 in a second direction may be resisted by the second angled surface 40 engaging the corresponding angled surface on the clamping member 24.

Figure 3A:
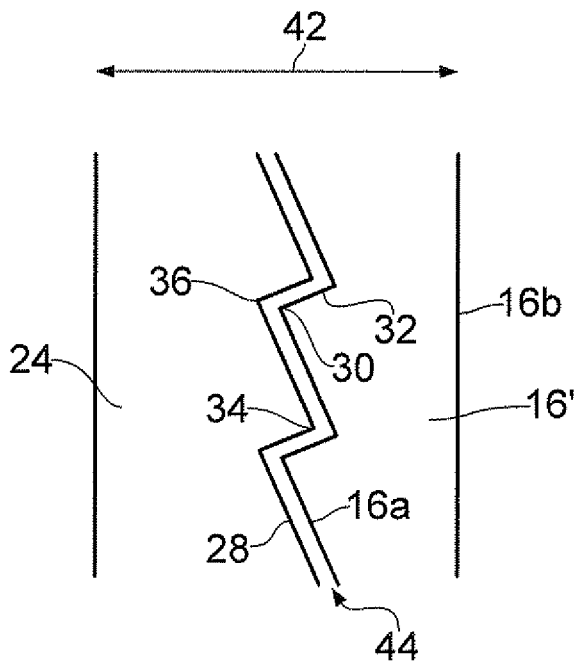
FIG. 3 is a circumferential sectional view through a portion of the bearing support member upon installation (FIG. 3a) and in the event the bearing seizes (FIG. 3b).

With reference to FIG. 3a, the protrusions 30, 34 and depressions 32, 36 interlock between the bearing support member 16 and the clamping member 24. On assembly, the bearing support member 16 and the clamping member 24 are orientated so that a gap 44 between them is as small as manufacturing tolerances permit. The axial length 42 of the combined bearing support member 16 and clamping member 24 is therefore at a minimum.

Figure 3B:
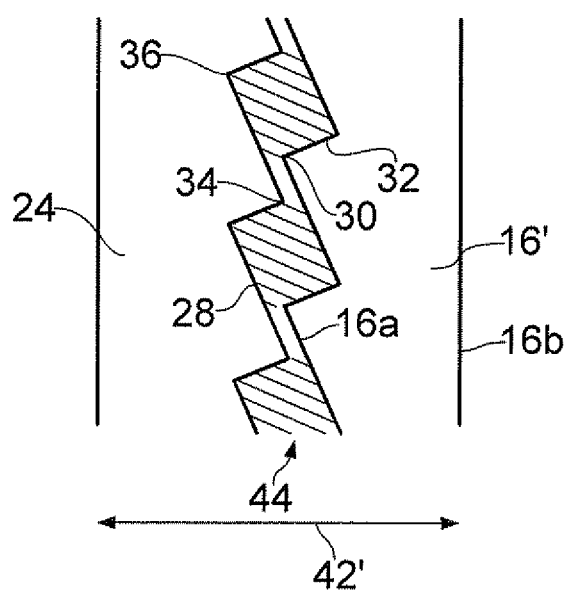

With reference to FIG. 3b, the protrusions 30, 34 and depressions 32, 36 are orientated so that if the bearing 6 seizes, the bearing support member 16 and the clamping member 24 will slide up each other, thereby increasing the gap 44 and the combined axial length 42' of the two components. This axial extension will increase the clamp load across the clamping assembly, because the bearing support member 16 and the clamping member 24 are axially constrained by the securing means 22. This increase in the clamp load will increase the friction between the bearing support member 16, the shaft 2 and the clamping member 24. This friction will be sufficient to prevent the bearing support member 16 from stopping rotating with the bearing 6.

An advantage of the present invention is that a smaller forging or casing envelope is required, as the axially disposed splines of the previously-proposed bearing assembly are not required. Furthermore, the components resulting from the present invention will have a lower weight, which is particularly important for gas turbines used as jet engines.

The present invention is applicable to any joint where rotating parts may stop rotating with respect to one another. The present invention may increase the clamp load to keep the parts rotating, thereby preventing further damage.

The invention claimed is:

1. A clamping assembly comprising a bearing support member, the bearing support member being clampable to a shaft by virtue of a clamping member adaptable to tighten the bearing support member to the shaft, wherein at least a portion of the bearing support member is disposable between a first abutment surface provided on the clamping member and a second abutment surface provided on the shaft; and wherein the portion of the bearing support member comprises one or more protrusions and one or more depressions provided on an end face of the portion of the bearing support member, the protrusions and depressions being arranged to interface with one or more corresponding depressions and protrusions provided on one of the first abutment surface of the clamping member and the second abutment surface of the shaft, the respective protrusions and depressions being disposed such that rotation of the bearing support member with respect to the shaft in a first direction results in the bearing support member being axially displaced with respect to the shaft and so as to resist relative rotation in a second direction between the shaft and the bearing support member.

2. A clamping assembly as claimed in claim 1, wherein the protrusions provided on the portion of the bearing support member comprise an angled surface angled with respect to a radial plane and the protrusions provided on one of the first abutment surface of the clamping member and the second abutment surface of the shaft comprise a corresponding angled surface such that rotation of the bearing support member with respect to the shaft in a first direction results in the bearing support member being axially displaced with respect to the shaft.

3. A clamping assembly as claimed in claim 2, wherein the respective protrusions and depressions have a triangular or saw-tooth wave profile.

4. A clamping assembly as claimed in claim 1, wherein the respective protrusions and depressions have a square wave profile.

5. A clamping assembly as claimed in claim 1, wherein the clamping assembly further comprises a securing means for clamping the clamping member and the bearing support member to the shaft, the securing means comprising a threaded portion adapted to engage a corresponding threaded portion provided on the shaft.

6. A clamping assembly as claimed in claim 1, wherein the clamping member comprises a threaded portion adapted to engage a corresponding threaded portion provided on the shaft.

7. A clamping assembly as claimed in claim 1, wherein the bearing support member supports a bearing, the bearing being disposed between a structure and the shaft, the shaft being rotatable with respect to the structure.

8. A clamping assembly as claimed in claim 1, wherein the bearing support member comprises a bearing race of a bearing, the bearing being disposed between a structure and the shaft, the shaft being rotatable with respect to the structure.

9. A turbomachine comprising a clamping assembly as claimed in claim 1.

10. A gas turbine comprising a clamping assembly as claimed in claim 1.

11. A bearing assembly comprising a bearing support member and a clamping member adaptable to clamp the bearing support member to a shaft, wherein at least a portion of the bearing support member is disposed between a first abutment surface provided on the clamping member and a second abutment surface provided on the shaft; and wherein the portion of the bearing support member comprises one or more protrusions and one or more depressions provided on an end face of the portion of the bearing support member, the protrusions and depressions being arranged to interface with one or more corresponding depressions and protrusions provided on one of the first abutment surface of the clamping member and the second abutment surface of the shaft, the respective protrusions and depressions being disposed such that rotation of the bearing support member with respect to the shaft in a first direction results in the bearing support member being axially displaced with respect to the shaft and so as to resist relative rotation in a second direction between the shaft and the bearing support member.

* * * * *